(12) United States Patent
Bando et al.

(10) Patent No.: US 9,057,781 B2
(45) Date of Patent: Jun. 16, 2015

(54) POSITION ESTIMATION DEVICE AND POSITION ESTIMATION METHOD

(75) Inventors: Mikio Bando, Mito (JP); Toshiyuki Aoki, Hitachi (JP); Tomoaki Hiruta, Hitachi (JP); Takayoshi Yokota, Hitachiota (JP); Hiroyuki Kohida, Zama (JP); Kazuhiro Okada, Ebina (JP); Zhixing Liu, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 840 days.

(21) Appl. No.: 13/029,570

(22) Filed: Feb. 17, 2011

(65) Prior Publication Data
US 2011/0208496 A1 Aug. 25, 2011

(30) Foreign Application Priority Data
Feb. 24, 2010 (JP) .................. 2010-038104

(51) Int. Cl.
*G06F 17/10* (2006.01)
*G01S 19/40* (2010.01)
*G01S 19/49* (2010.01)

(52) U.S. Cl.
CPC . *G01S 19/49* (2013.01); *G01S 19/40* (2013.01)

(58) Field of Classification Search
None
See application file for complete search history.

(56) References Cited

U.S. PATENT DOCUMENTS

| | | | |
|---|---|---|---|
| 5,499,306 A * | 3/1996 | Sasaki et al. | 382/291 |
| 5,686,925 A | 11/1997 | Maeda et al. | |
| 6,289,280 B1 * | 9/2001 | Fernandez-Corbaton et al. | 701/469 |
| 6,816,799 B2 * | 11/2004 | Yu et al. | 702/94 |
| 6,983,205 B2 * | 1/2006 | Chen et al. | 701/517 |
| 7,222,007 B2 * | 5/2007 | Xu et al. | 701/38 |
| 7,865,299 B2 * | 1/2011 | Caveney | 701/501 |
| 8,260,325 B2 * | 9/2012 | Bando et al. | 455/456.6 |
| 8,295,585 B2 * | 10/2012 | Wienand et al. | 382/151 |

(Continued)

FOREIGN PATENT DOCUMENTS

| | | |
|---|---|---|
| CN | 1590965 A | 3/2005 |
| CN | 101285879 A | 10/2008 |

(Continued)

OTHER PUBLICATIONS

Christopher M. Bishop, "7. Sparse Kernel Machines" pp. 325-331, 2006.*

(Continued)

*Primary Examiner* — Kibrom K Gebresilassie
(74) *Attorney, Agent, or Firm* — Crowell & Moring LLP

(57) ABSTRACT

A position estimation device includes: a mathematical expression model processing unit that calculates a position of a mobile object, a condition quantity indicating a moving condition of the mobile object and an error in the condition quantity through filtering processing executed by using a probability model based upon an attitude information and a positioning information of the mobile object having been obtained from sensors and a specific mathematical expression model among a plurality of mathematical expression models expressing behavior of the mobile object; a threshold calculation unit that calculates a threshold candidate value for a threshold value to be used as a criterion when selecting the specific mathematical expression model, by using the error; a threshold value determining unit that determines the threshold value based upon the threshold candidate value; and a mathematical expression model selection unit that selects the specific mathematical expression model based upon the threshold value.

7 Claims, 13 Drawing Sheets

(56) References Cited

U.S. PATENT DOCUMENTS

| | | | |
|---|---|---|---|
| 8,401,234 B2* | 3/2013 | Tanigawa | 382/103 |
| 8,437,535 B2* | 5/2013 | Boca et al. | 382/154 |
| 8,489,317 B2* | 7/2013 | Caveney et al. | 701/301 |
| 8,692,709 B2* | 4/2014 | Sambongi | 342/357.32 |
| 2002/0059017 A1* | 5/2002 | Yamane et al. | 701/1 |
| 2004/0024565 A1* | 2/2004 | Yu et al. | 702/151 |
| 2004/0083037 A1* | 4/2004 | Yamane et al. | 701/1 |
| 2004/0158398 A1* | 8/2004 | Chen et al. | 701/209 |
| 2005/0149261 A9 | 7/2005 | Lee et al. | |
| 2005/0197768 A1* | 9/2005 | Kaikuranta et al. | 701/213 |
| 2006/0212222 A1* | 9/2006 | Miyoshi et al. | 701/301 |
| 2007/0005212 A1* | 1/2007 | Xu et al. | 701/70 |
| 2007/0078566 A1* | 4/2007 | Wang et al. | 700/259 |
| 2007/0265741 A1* | 11/2007 | Ol et al. | 701/23 |
| 2008/0071469 A1* | 3/2008 | Caveney | 701/207 |
| 2008/0077325 A1* | 3/2008 | Bye et al. | 701/220 |
| 2008/0228395 A1 | 9/2008 | Kobori et al. | |
| 2009/0243932 A1* | 10/2009 | Moshfeghi | 342/378 |
| 2011/0021207 A1* | 1/2011 | Morgan et al. | 455/456.1 |
| 2011/0106450 A1* | 5/2011 | Toda et al. | 701/216 |
| 2011/0142016 A1* | 6/2011 | Chatterjee | 370/338 |
| 2011/0205358 A1* | 8/2011 | Aota et al. | 348/143 |
| 2012/0062414 A1* | 3/2012 | Sambongi | 342/357.25 |
| 2012/0176270 A1* | 7/2012 | Shin | 342/357.28 |

FOREIGN PATENT DOCUMENTS

| | | |
|---|---|---|
| CN | 101316439 A | 12/2008 |
| CN | 101592492 A | 12/2009 |
| EP | 0 690 314 A1 | 1/1996 |
| EP | 1 903 308 A2 | 3/2008 |
| JP | 5-333132 A | 12/1993 |
| JP | 8-14923 A | 1/1996 |
| JP | 2007-256041 | 10/2007 |
| JP | 2007-322391 A | 12/2007 |
| JP | 2008-26282 A | 2/2008 |
| JP | 2008-287669 A | 11/2008 |
| WO | WO 96/12973 A1 | 5/1996 |

OTHER PUBLICATIONS

Chinese Office Action dated Feb. 25, 2013 w/ English translation (sixteen (16) pages).

European Search Report dated Dec. 20, 2013 (four (4) pages).

Toshihito Aono et al., "Positioning of a Vehicle on Undulating Ground Using GPS and Internal Sensors", pp. 1004-1007, Transactions, including English translation, Oct. 8, 1998.

Masato Abe, "Automotive Vehicle Dynamics", pp. 64-66, Tokyo Denki University Press, Mar. 2008, including English translation.

Toshihiro Aono et al., "Positioning Of A Vehicle On Undulating Ground Using GPS And Internal Sensors", pp. 1004-1007, Transactions, including English translation.

Christopher M. Bishop, "Pattern Recognition And Machine Learning", pp. 35-41, Springer Japan, Jul. 1, 2008, including English translation.

* cited by examiner

FIG.5

MATHEMATICAL EXPRESSION MODEL VARIABLE TABLE 111

| VARIABLE NAME/ DOMINANT | CONDITION QUANTITY COEFFICIENT 1 | CONDITION QUANTITY COEFFICIENT 2 | CONDITION QUANTITY COEFFICIENT 3 | CONDITION QUANTITY COEFFICIENT 4 | CONDITION QUANTITY COEFFICIENT 5 | |
|---|---|---|---|---|---|---|
| MATHEMATICAL EXPRESSION MODEL 1 | — | — | $\alpha/1$ | — | — | ... |
| MATHEMATICAL EXPRESSION MODEL 2 | — | $\beta/0$ | — | $\gamma/1$ | — | ... |
| ⋮ | ⋮ | ⋮ | ⋮ | ⋮ | ⋮ | |

FIG.9

MATHEMATICAL EXPRESSION MODEL TABLE

| THRESHOLD CANDIDATE VALUE (CONDITION QUANTITY) | | GYRO BIAS | | GYRO SCALE FACTOR | | SENSOR MOUNTING ANGLE | | STEERING ANGLE CHARACTERISTICS | | ... |
|---|---|---|---|---|---|---|---|---|---|---|
| | | LEARNING COMPLETE | LEARNING INCOMPLETE | LEARNING COMPLETE | LEARNING INCOMPLETE | LEARNING COMPLETE | LEARNING INCOMPLETE | LEARNING COMPLETE | LEARNING INCOMPLETE | |
| SPEED | LOWER THAN THRESHOLD VALUE | 1 | 1 | 1 | 1 | 1/2 | 1 | 1 | — | ⋮ |
| | HIGHER THAN THRESHOLD VALUE | 2 | 2 | 2 | 2 | 2 | 2 | 2 | 2 | ⋮ |
| SLIP ANGLE | LARGER THAN THRESHOLD VALUE | 2 | — | 2 | — | 2 | — | — | — | ⋮ |
| | SMALLER THAN THRESHOLD VALUE | 2 | 2 | 2 | 2 | 2 | 2 | — | — | ⋮ |
| GPS RECEPTION CONDITION | LARGER THAN THRESHOLD VALUE | 2 | 1 | 2 | 1 | 2 | 1 | 1 | — | ⋮ |
| | SMALLER THAN THRESHOLD VALUE | 2 | 1 | — | — | — | 1 | — | — | ⋮ |
| EXTENT OF MAP ERROR | SMALLER THAN THRESHOLD VALUE | — | — | — | — | — | — | — | — | ⋮ |
| | LARGER THAN THRESHOLD VALUE | — | — | — | — | — | — | — | — | ⋮ |
| ... | | ... | ... | ... | ... | ... | ... | ... | ... | ⋮ |

FIG.11

MATHEMATICAL EXPRESSION MODEL TABLE

| THRESHOLD CANDIDATE VALUE (CONDITION QUANTITY) | | GYRO BIAS | | GYRO SCALE FACTOR | | SENSOR MOUNTING ANGLE | | STEERING ANGLE CHARACTERISTICS | |
|---|---|---|---|---|---|---|---|---|---|
| | | LEARNING COMPLETE | LEARNING INCOMPLETE | LEARNING COMPLETE | LEARNING INCOMPLETE | LEARNING COMPLETE | LEARNING INCOMPLETE | LEARNING COMPLETE | LEARNING INCOMPLETE |
| SPEED | LOWER THAN THRESHOLD VALUE | — | — | — | — | — | — | — | — |
| | HIGHER THAN THRESHOLD VALUE | — | — | — | — | — | — | — | — |
| SLIP ANGLE | LARGER THAN THRESHOLD VALUE | — | — | — | — | — | — | — | — |
| | SMALLER THAN THRESHOLD VALUE | — | — | — | — | — | — | — | — |
| GPS RECEPTION CONDITION | LARGER THAN THRESHOLD VALUE | 5 | 5 | 5 | 5 | 5 | 5 | 5 | 5 |
| | SMALLER THAN THRESHOLD VALUE | 6 | 6 | 6 | 6 | 6 | 6 | 6 | 6 |
| EXTENT OF MAP ERROR | SMALLER THAN THRESHOLD VALUE | — | — | — | — | 5 | — | — | — |
| | LARGER THAN THRESHOLD VALUE | 5 | — | 5 | — | — | — | — | — |
| ... | | ... | ... | ... | ... | ... | ... | ... | ... |

FIG.13

MATHEMATICAL EXPRESSION MODEL TABLE

| THRESHOLD CANDIDATE VALUE (CONDITION QUANTITY) | GYRO BIAS | | GYRO SCALE FACTOR | | SENSOR MOUNTING ANGLE | | STEERING ANGLE CHARACTERISTICS | | ... |
|---|---|---|---|---|---|---|---|---|---|
| | LEARNING COMPLETE | LEARNING INCOMPLETE | LEARNING COMPLETE | LEARNING INCOMPLETE | LEARNING COMPLETE | LEARNING INCOMPLETE | LEARNING COMPLETE | LEARNING INCOMPLETE | |
| SPEED — LOWER THAN THRESHOLD VALUE | — | — | — | — | — | — | — | — | ... |
| SPEED — HIGHER THAN THRESHOLD VALUE | — | — | — | — | — | — | — | — | ... |
| SLIP ANGLE — LARGER THAN THRESHOLD VALUE | — | — | — | — | — | — | — | — | ... |
| SLIP ANGLE — SMALLER THAN THRESHOLD VALUE | 5 | 5 | 5 | 5 | 5 | 5 | 5 | 5 | ... |
| GPS RECEPTION CONDITION — LARGER THAN THRESHOLD VALUE | 7 | — | 7 | 7 | 7 | — | 7 | — | ... |
| GPS RECEPTION CONDITION — SMALLER THAN THRESHOLD VALUE | 7 | — | 5 | — | 7 | — | 7 | — | ... |
| EXTENT OF MAP ERROR — SMALLER THAN THRESHOLD VALUE | 5 | — | 5 | — | 5 | — | 7 | — | ... |
| EXTENT OF MAP ERROR — LARGER THAN THRESHOLD VALUE | ... | ... | ... | ... | ... | ... | ... | ... | ... |

POSITION ESTIMATION DEVICE AND POSITION ESTIMATION METHOD

INCORPORATION BY REFERENCE

The disclosures of the following priority applications is herein incorporated by reference: Japanese Patent Application No. 2010-38104 filed Feb. 24, 2010.

BACKGROUND OF THE INVENTION

1. Field of the Invention

The present invention relates to an on-board apparatus installed in a mobile object such as an automobile or an electric train and, more specifically, it relates to a device that estimates a position.

2. Description of Related Art

A car navigation system in the related art determines the subject vehicle position through map matching executed based upon positioning results. In a vehicle motion control system in which the vehicle position provided by a car navigation system is output to a vehicle motion control device such as that disclosed in Japanese Laid Open Patent Publication No. 2008-287669, the vehicle position must be measured with a higher level of accuracy.

A technology whereby a plurality of mathematical expression models, to be used for subject vehicle calculation, are prepared and a subject vehicle position calculation is executed by switching from one mathematical expression model to another based upon a specific threshold value determined in advance, has been proposed as a measure for assuring accurate positioning. For instance, Japanese Laid Open Patent Publication No. H8-14923 discloses an apparatus that switches to position calculation via a relative sensor such as a gyro sensor or an acceleration sensor if the error in the position signal output from a global positioning system (GPS) is equal to or greater than a specific extent, based upon information indicating the GPS signal strength, the satellite positions and the like.

Systems that estimate the subject vehicle position by using a probability system such as the Kalman filter probability model include an apparatus disclosed in Japanese Laid Open Patent Publication No. H5-333132. The approach measures the subject vehicle position by switching from one Kalman filter to another among a plurality of Kalman filters prepared in advance in a quantity corresponding to the number of GPS satellites from which signals can be received. The technologies for estimating the subject vehicle position by using a position estimation logic based upon a probability model such as a Kalman filter probability model or a particle filter probability model, include the technology disclosed in Japanese Laid Open Patent Publication No. 2007-322391, which estimates the subject vehicle position based upon an extended Kalman filter algorithm.

Positioning error models used in the known art used in a car navigation system that switches position calculation methods based upon the positioning error and is equipped with a steering angle sensor and a gyro sensor, include the speed-based Ackermann model and dead-reckoning models. In a car navigation system equipped with a GPS and a gyro sensor in the known art, a sensor fusion model may be used when the GPS is used and a dead-reckoning model may be used if no GPS signals are received or the GPS is not used.

The Ackermann model is described in "Automotive Vehicle Dynamics" by Masato Abe, published by Tokyo Denki University Press, March, 2008, ISBN: 9784501417000. The sensor fusion model and an internal sensor model are described in "Positioning of a Vehicle on Undulating Ground Using GPS and Internal Sensors" by Toshihiro Aono et. al in the Collection of Research Papers, Vol. 35, No. 8, 1999, published by the Society of Instrument Control Engineers.

As described in Japanese Laid Open Patent Publication No. 2008-26282, disclosing a mathematical expression model that allows links in digital map data to be utilized in a Kalman filter observation equation, the subject vehicle position may be set on a digital map through map matching in conjunction with a sensor fusion model (hereafter referred to as a "link fusion model") so as to enable map matching operation based upon the link information included in the digital map information.

SUMMARY OF THE INVENTION

The extent of error in vehicle positioning is affected by various conditions such as the condition of the terrain through which the vehicle is traveling, the temperature outside the vehicle, the ages of various components of the vehicle and the characteristics of the particular driver driving the vehicle. It is difficult to determine in advance an optimal threshold value to be used as a criterion for switching from one mathematical expression model to another in correspondence to the extent of the positioning error in each, while taking into consideration these factors. Furthermore, in certain circumstances, a fixed threshold value set in advance may increase the modeling error, which, in turn, may negatively affect the calculation accuracy with which the subject position is estimated.

According to the first aspect of the present invention, a position estimation device, comprises: a mathematical expression model processing unit that obtains attitude information and positioning information indicating an attitude and a measured position of a mobile object from sensors and calculates a position of the mobile object, a condition quantity indicating a moving condition of the mobile object and an error in the condition quantity through filtering processing executed by using a probability model based upon the attitude information and the positioning information having been obtained and a specific mathematical expression model among a plurality of mathematical expression models expressing behavior of the mobile object, which are acquired in advance; a threshold calculation unit that calculates a threshold candidate value for a threshold value to be used as a criterion when selecting the specific mathematical expression model, by using the error having been calculated by the mathematical expression model processing unit; a threshold value determining unit that determines the threshold value based upon the threshold candidate value; and a mathematical expression model selection unit that selects the specific mathematical expression model based upon the threshold value determined by the threshold value determining unit.

According to the second aspect of the present invention, the position estimation device according to the first aspect, it is preferred that restrictions imposed with regard to a valid range within which each of the plurality of mathematical expression models expressing the behavior is applicable to the behavior, are defined based upon information that can be collected through observation made from outside or based upon the position, the condition quantity and the error calculated by the mathematical expression model processing unit; the threshold value determining unit determines the threshold value based upon values representing extents of the error calculated each in correspondence to one of the plurality of mathematical expression models; and the mathematical expression model selection unit selects the specific mathematical expression model in correspondence to the restrictions.

According to the third aspect of the present invention, the position estimation device according to the second aspect, it is preferred that the position estimation device further comprises a database in which the restrictions and the threshold value are stored.

According to the fourth aspect of the present invention, the position estimation method comprises: obtaining attitude information and positioning information indicating an attitude and a measured position of a mobile object from sensors; calculating a position of the mobile object, a condition quantity indicating a moving condition of the mobile object and an error in the condition quantity through filtering processing executed by using a probability model based upon the attitude information and the positioning information having been obtained and a specific mathematical expression model among a plurality of mathematical expression models expressing behavior of the mobile object, which are acquired in advance; calculating a threshold candidate value for a threshold value to be used as a criterion when selecting the specific mathematical expression model, by using the error having been calculated; determining the threshold value based upon the candidate value; and selecting the specific mathematical expression model based upon the threshold value having been determined.

According to the fifth aspect of the present invention, the position estimation method according to the fourth aspect, it is preferred that restrictions imposed with regard to a valid range, within which each of the plurality of mathematical expression models expressing the behavior is applicable to the behavior, are defined based upon information that can be collected through observation made from outside or based upon the position, the condition quantity and the error having been calculated; the threshold value is determined based upon values representing extents of the error calculated each in correspondence to one of the plurality of mathematical expression models; and the specific mathematical expression model is selected in correspondence to the restrictions.

BRIEF DESCRIPTION OF THE DRAWINGS

FIG. 5 shows a mathematical expression model variable table.

FIG. 9 presents a mathematical expression model table related to the Ackermann model and the dead-reckoning model.

FIG. 11 presents a mathematical expression model table related to the sensor-fusion model and the internal-sensor mathematical expression model.

FIG. 13 presents a mathematical expression model table related to the link-fusion model and the INS model.

DESCRIPTION OF PREFERRED EMBODIMENTS

If a fixed threshold value is used as a criterion for switching from one mathematical expression model to another in correspondence to the extent of positioning error in each, the calculation accuracy with which the subject vehicle position is estimated may be seriously compromised. If the subject vehicle position calculation accuracy is a factor in vehicle motion control, in particular, the accuracy of the vehicle control itself may be adversely affected. According to the present invention, a value calculated by using parameters, variables, coefficients or the like, estimated or learned for specific purposes of subject vehicle position calculation, instead of a fixed value prepared in advance, is used as the threshold value based upon which a switchover from one mathematical expression model to another, among a plurality of mathematical expression models prepared in advance to be used for positioning purposes, is made, so as to sustain a high level of subject vehicle position estimation accuracy in any situation. In a vehicle position estimation device that switches to (selects) a specific mathematical expression model to be used in positioning based upon the threshold value calculated as described above, the calculation accuracy with which the subject vehicle position is estimated will not be compromised. Car navigation systems and auto-cruise systems must be able to estimate the absolute position of the subject vehicle with a high level of accuracy. By switching to a specific model, to be used when estimating the absolute position of the subject vehicle, based upon the threshold value calculated as described above in such a system, the subject vehicle position will be estimated with high accuracy at all times under any conditions or circumstances. Namely, based upon the error manifested in the mathematical expression models themselves, a crucial factor in achieving accurate estimation of position, information indicating reliability of the subject vehicle position can be output. The following is a detailed description of a positioning device adopting the present invention.

First Embodiment

Figure 1:
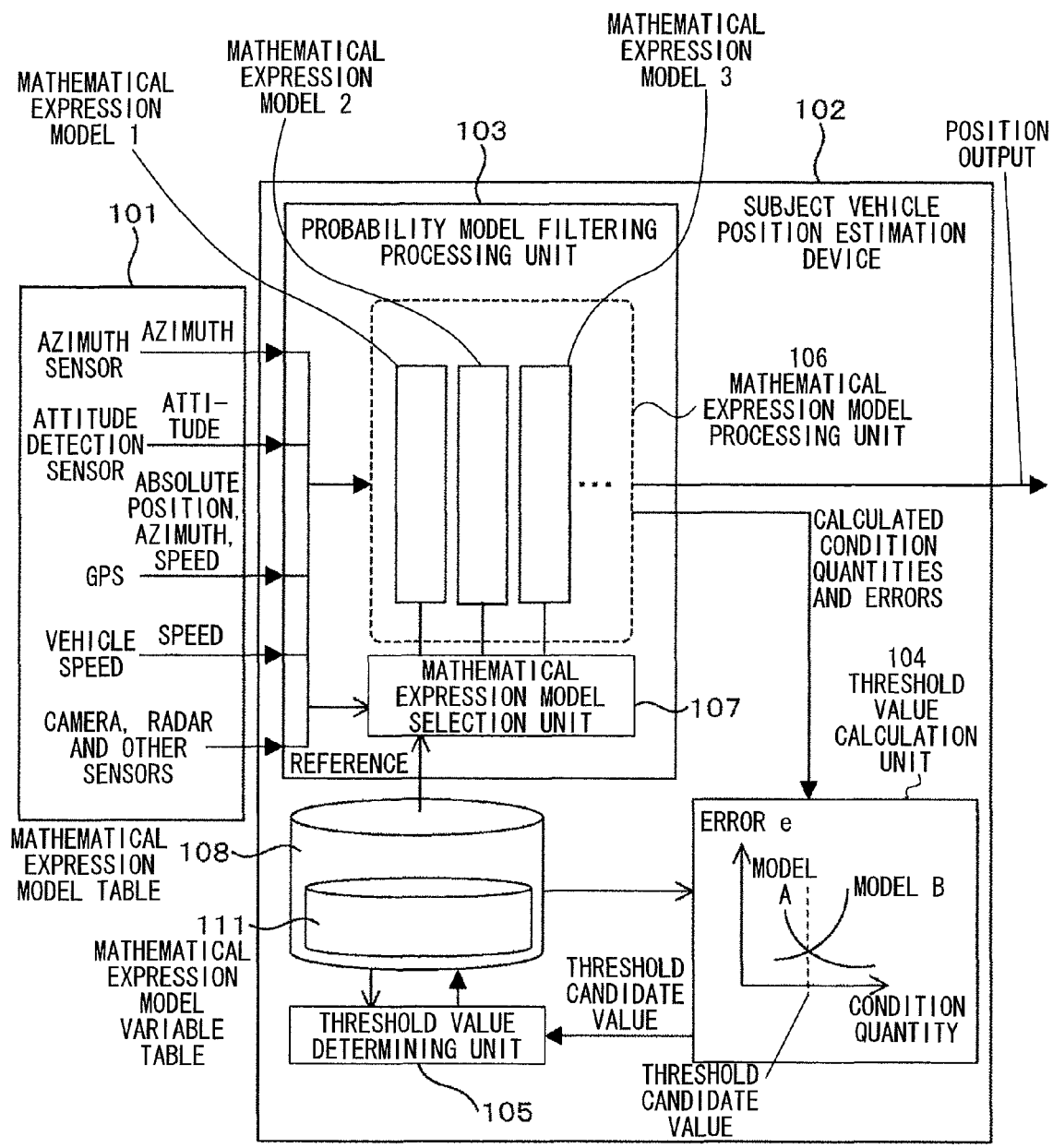
FIG. 1 schematically shows the structure of a positioning device.

FIG. 1 schematically illustrates the structure of a positioning device adopting the present invention. The positioning device, which may be a car navigation system or a dedicated terminal, includes sensors 101, which obtain current attitude information and location positioning information indicating the current attitude and a measured position of the vehicle in which the positioning device is installed, and a subject vehicle position estimation device 102. The subject vehicle position estimation device 102 includes a probability model filtering processing unit 103 that cyclically calculates the vehicle position by using a mathematical expression model based upon a probability model such as a Kalman filter, a threshold value calculation unit 104 that calculates a threshold candidate value that may be used as a threshold value for switching to another mathematical expression model to be used by the probability model filtering processing unit 103 for vehicle position calculation, based upon a condition quantity indicating a vehicle moving condition such as a speed calculated by the probability model filtering processing unit 103 or an error in the calculated condition quantity, and a threshold value determining unit 105 that determines a threshold value to be used as a criterion for switching to another mathematical expression model to be used by the probability model filter processing unit 103 for purposes of calculation based upon the threshold candidate value calculated by the threshold value calculation unit 104 and characteristics of mathematical expression models used in the probability model filtering processing unit 103.

The probability model filter processing unit 103 includes a mathematical expression model processing unit 106 constituted with a plurality of mathematical expression models expressing vehicle behavior, to be used when calculating the subject vehicle position, and a mathematical expression model selection unit 107 that selects, based upon the threshold value determined by the threshold value determining unit 105, specific mathematical expression model to be used in the mathematical expression model processing unit 106 to calculate values for various elements in a transition matrix. The values of the various elements in the transition matrix, constituted with a state equation or the like in a probability model such as a Kalman filter probability model, are calculated by the mathematical expression model processing unit 106. The mathematical expression models, each equivalent to one of equations constituting a state equation or an observation equation expressing a positioning algorithm model, are managed by identification numbers assigned thereto. In the mathematical expression model processing unit 106, a probability model calculation is executed in conjunction with probability models, such as a Kalman filter, by solving state equations and observation equations corresponding to the plurality of mathematical expression models.

The threshold value determining unit 105 saves the threshold candidate value calculated by the threshold value calculation unit 104 and sets a threshold value in a mathematical expression model table 108 used by the mathematical expression model selection unit 107 to select or alter the mathematical expression model to be used in calculation at the mathematical expression model processing unit 106. In the mathematical expression model table 108, a mathematical expression model variable table 111 listing coefficients in each of the mathematical expression models constituting a state equation or an observation equation written by using condition quantities input from the sensors 101 as variables, is stored.

From the sensors 101, which obtain the vehicle attitude information and the vehicle location positioning information, data indicating a subject vehicle attitude, the direction along which the subject vehicle is moving, the speed at which the subject vehicle is moving or the approximate global position are input to the subject vehicle position estimation device 102. Based upon these input values, the mathematical expression model selection unit 107 at the probability model filtering processing unit 103 selects a mathematical expression model to be used by the mathematical expression model processing unit 106 for the transition matrix calculation and the probability model filtering processing unit 103 outputs the position determined through the calculation executed by using the selected mathematical expression model. Condition quantities other than the position calculated by using the mathematical expression model at the mathematical expression model processing unit 106 are input to the threshold value calculation unit 104.

Based upon the characteristics of the plurality of mathematical expression models prepared at the mathematical expression model processing unit 106, the threshold value calculation unit 104 determines through calculation the relationship between a condition quantity and an error manifested by each mathematical expression model and determines a threshold candidate value for the particular mathematical expression model. The threshold candidate value thus determined is input to the threshold value determining unit 105. The threshold value determining unit 105 determines a threshold value for the plurality of mathematical expression models based upon the extents of error manifesting when the individual mathematical expression models are adopted and the corresponding condition quantity, and stores the threshold value into the mathematical expression model table 108 so as to enable the mathematical expression model selection unit 107 to reference the threshold values. Threshold values, each determined by the threshold value determining unit 105 in correspondence to a specific condition quantity, can be referenced by the mathematical expression model selection unit 107 within the probability model filtering processing unit 103. The threshold values are used for selecting an optimal mathematical expression model among the plurality of mathematical expression models in the mathematical expression model processing unit 106 when data provided by the sensor 101 that collect the vehicle attitude information and the vehicle location positioning information are input to the subject vehicle position estimation device 102 for the next position calculation cycle. As this sequence is executed through cyclical loop processing, optimal threshold values are sequentially determined for the individual condition quantities and the mathematical expression model table 108 is continuously updated.

Information indicating the azimuth on which the subject vehicle is moving, the vehicle attitude such as the tilt of the subject vehicle, the absolute position of the subject vehicle, the speed at which the subject vehicle is moving, a relative position and azimuth of the subject vehicle in relation to another object and the relative relation of the subject vehicle attitude to that of another object and the like, is output from the sensors 101 that obtain the vehicle attitude information and the vehicle location positioning information.

The absolute position of the vehicle may be calculated by a sensor capable of directly calculating the position, such as a GPS sensor, or via a camera or a sensor such as a radar sensor that measures the absolute position and a relative position in relation to an object, the shape of which is known.

The azimuth on which the vehicle is moving may be calculated based upon a signal output from a geomagnetic sensor capable of directly measuring the absolute azimuth, a signal provided by an azimuth sensor, such as a gyro sensor, that calculates the azimuth by integrating an angular speed measured in conjunction with a given initial azimuth, or GPS signals received at different time points.

The speed at which the vehicle is moving may be calculated based upon a signal provided by a vehicle speed pulse sensor capable of directly calculating the speed, a signal provided by an acceleration sensor that calculates the speed by detecting and integrating the vehicle acceleration, or GPS signals received at different time points.

The vehicle attitude may be calculated based upon a signal provided by an attitude detection sensor, such as an acceleration sensor, which detects the tilt of the vehicle by detecting the direction of gravitational force, a signal provided by a radar sensor capable of measuring a relative attitude in relation to an object, the shape of which is known, or an image generated in a camera capable of measuring the tilt of an object, the shape of which is known, relative to the subject vehicle.

The mathematical expression model processing unit 106 in the probability model filtering processing unit 103 estimates a position by using a plurality of mathematical expression models adopting a position estimation logic based upon a probability model such as a Kalman filter probability model or a particle filter probability model. The subject vehicle position estimation achieved based upon the extended Kalman filter algorithm mentioned earlier is a typical example of position estimation logic-based position estimation. In a probability model-based position estimation logic, information indicating the subject vehicle azimuth, position, attitude and speed, output from the sensors 101 or calculated by the mathematical expression model processing unit 106, is expressed as an observation equation written by taking into consideration their errors and transitional subject vehicle azimuth, position, attitude and speed from a given time point to a subsequent time point are expressed as a state equation. Filtering processing is executed by calculating the observation equation and the state equation in correspondence to the individual mathematical expression models in the mathematical expression model processing unit 106.

The mathematical expression model processing unit 106 obtains through estimation information related to the azimuth, attitude and speed (condition quantities) together with the information indicating the estimated subject vehicle position. The condition quantities thus calculated are output to the threshold value calculation unit 104. Any calculation results indicating an error, obtained through calculation executed by the mathematical expression model processing unit 106 by using a mathematical expression model for error calculation or error variance calculation, are also output from the mathematical expression model processing unit 106.

Figure 2:
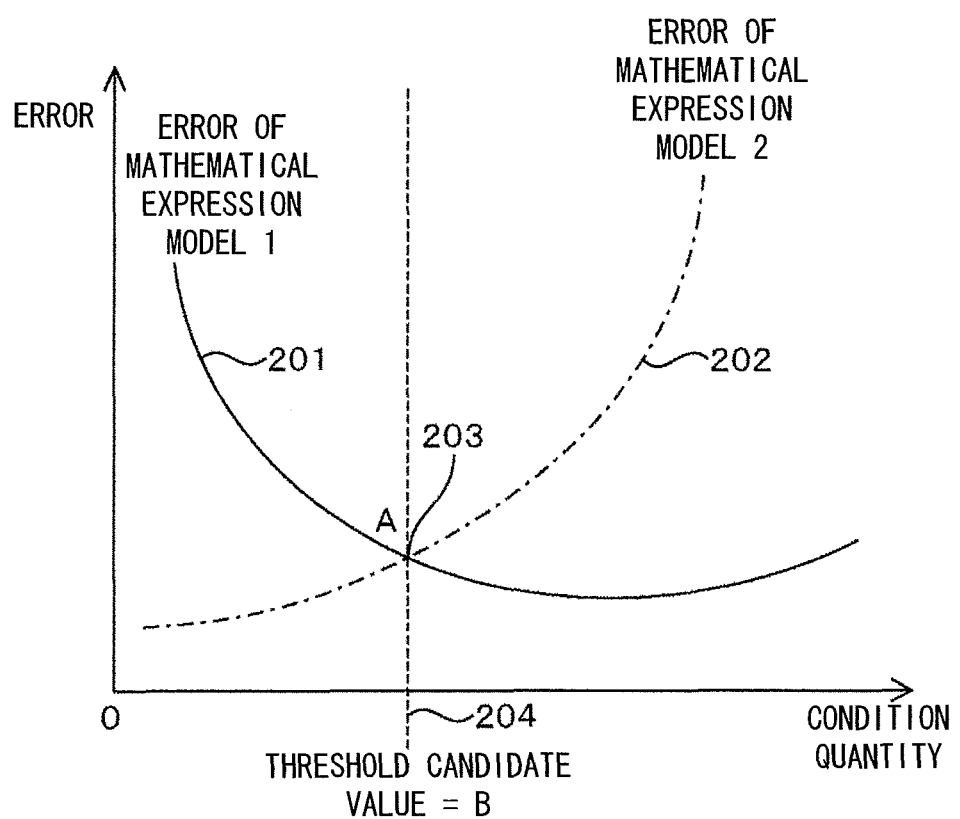
FIG. 2 indicates the correlation of a condition quantity and mathematical expression model errors.

The threshold value calculation unit 104 estimates errors of the plurality of mathematical expression models in the mathematical expression model processing unit 106 in correspondence to the condition quantities input from the probability model filtering processing unit 103. FIG. 2 presents an example of a correlation that may exist between a condition quantity and the corresponding errors manifested by mathematical expression models in a schematic diagram. The condition quantity input from the probability model filtering processing unit 103 is indicated along the horizontal axis and the values representing the errors, input from the probability model filtering processing unit 103 together with the condition quantity, are indicated along the vertical axis in FIG. 2. Error values corresponding to the condition quantity manifested by different mathematical expression models are indicated in FIG. 2. A curve 201 represents a change in the error relative to the condition quantity manifested by mathematical expression model 1, whereas a curve 202 represents a change in the error relative to the condition quantity manifested by mathematical expression model 2. An intersecting point A 203 at which the curve 201 and the curve 202 intersect each other is a turning point at which the relationship between the error of mathematical expression model 1 and the error of mathematical expression model 2 becomes reversed. Namely, in the condition quantity range to the right of the intersecting point A 203, i.e., when the condition quantity is greater than a condition quantity B 204 at the intersecting point A 203, the calculation executed by using mathematical expression model 1 assures a smaller error, whereas in the condition quantity range to the left of the intersecting point A 203, i.e., when the condition quantity is smaller than the condition quantity B 204 at the intersecting point A 203, the calculation executed by using mathematical expression model 2 assures a smaller error. The value B 204 representing the condition quantity at the intersecting point A 203 is designated as a threshold candidate value that may be used as a decision-making criterion for switching to the other mathematical expression model, to be used in the filtering processing, and this threshold candidate value is then output to the threshold value determining unit 105.

Figure 3:
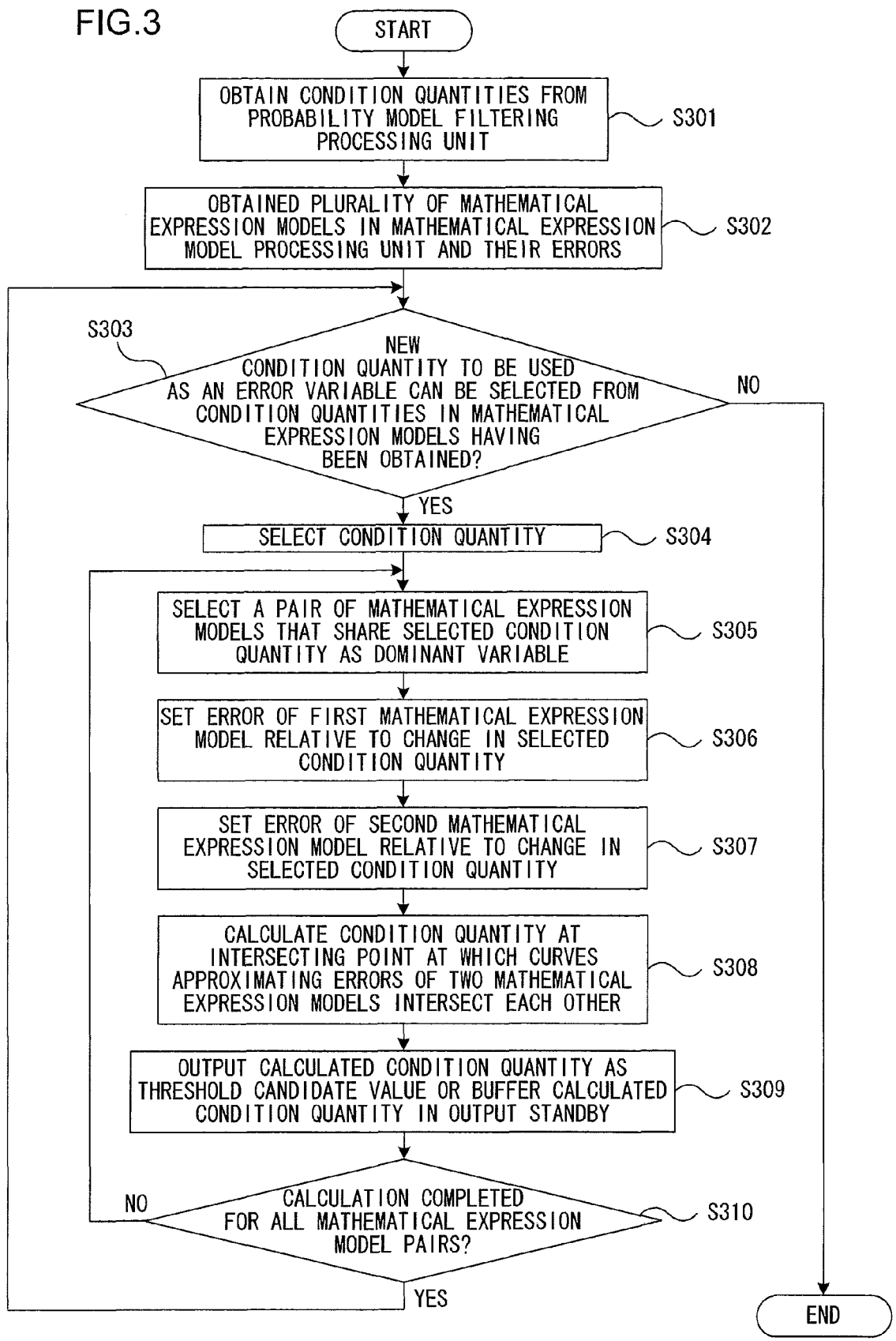
FIG. 3 presents a flowchart of the threshold candidate value generation processing.

FIG. 3 shows the flow of threshold candidate value generation processing executed in the threshold value calculation unit 104. In this processing, the errors of two mathematical expression models, among the mathematical expression models managed in the mathematical expression model processing unit 106, are compared and a threshold candidate value for the two mathematical expression models is determined. First, condition quantities calculated by the mathematical expression model processing unit 106 are obtained from the probability model filtering processing unit 103 (step S301). Among the condition quantities thus obtained, no more than a predetermined number of most recently calculated values are stored in correspondence to each mathematical expression model having been used in the calculation. Next, a list of a plurality of mathematical expression models that use the condition quantities obtained in step S301, among the plurality of mathematical expression models in the mathematical expression model processing unit 106, is created. A state equation or an observation equation is configured with coefficients corresponding to the condition quantities ascertained by referencing the mathematical expression model variable table 111 for each of the mathematical expression models included in the list having been created. In the following explanation, obtaining a mathematical expression model coefficient corresponding to a condition quantity is to be described as "obtaining a mathematical expression model". Errors are each ascertained in correspondence to one of the mathematical expression models through calculation executed based upon the condition quantity having been obtained (step S302). It is assumed that only mathematical expression models needed when determining threshold candidate values are set in advance in the mathematical expression model variable table 111. It is also assumed that no more than a predetermined number of most recent values indicating the error of each mathematical expression obtained model is stored in the threshold value calculation unit 104 in correspondence to the particular mathematical expression model used in the calculation.

A decision is made as to whether or not the list created in step S302 includes a yet-to-be processed condition quantity among the condition quantities obtained in step S301 in correspondence to the mathematical expression models that contain a condition quantity to be used for purposes of comparing errors manifested by mathematical expression models, i.e., in correspondence to the mathematical expression models containing a condition quantity considered as a dominant variable (step S303). It is assumed that condition quantities to be designated as dominant variables are defined in advance in the mathematical expression model variable table 111 stored in the mathematical expression model table 108. As indicated in FIG. 5, the names of variables corresponding to the condition quantities processed through each mathematical expression model among the mathematical expression models in the mathematical expression model processing unit 106 and flags each indicating whether or not the corresponding variable is dominant are stored in the mathematical expression model variable table 111. Only the mathematical expression models needed when determining threshold candidate values are set in advance in the mathematical expression model variable table 111. The mathematical expression models are searched sequentially in the order of the numbers assigned thereto in the mathematical expression model table to determine whether or not there is any mathematical expression model containing a selection target condition quantity. Upon detecting a yet-to-be processed condition quantity, the particular condition quantity is selected (step S304).

Next, a search for mathematical expression models that use the selected condition quantity as a dominant variable is conducted. The list created in step S302 is searched sequentially starting from the first entry, and a pair of mathematical expression models that use the same condition quantity as a dominant variable thereof is selected (step S305) by spotting a first yet-to-be processed mathematical expression model and then looking for a next mathematical expression model using the same condition quantity as a dominant variable. Upon finding a pair of such mathematical expression models, the numbers indicating the most recently checked positions in the mathematical expression model variable table and the mathematical expression model table are temporarily saved before the operation proceeds to execute the processing in steps S306 and S307.

If there is at least one pair of comparison target mathematical expression models, the curve 201 and the curve 202 in FIG. 2 are determined for the pair of error-comparison target mathematical expression models, i.e., for the two mathematical expression models, in steps S306 and S307. The curve 201 and the curve 202 can be determined by setting the error values having been ascertained in step S302 as the errors occurring in relation to the change in the condition quantity selected in step S304. The intersecting point A 203 at which the curves, determined through steps S306 and S307 based upon the calculated or estimated errors, intersect each other is calculated and then the value representing the condition quantity at the intersecting point A203 is calculated (step S308). The condition quantity value thus calculated is either output as a threshold candidate value to the threshold value determining unit 105 or is buffered in an output standby state (step S309).

In step S310, the list of mathematical expression models created in step S302 is sequentially searched starting with the most recently searched position for mathematical expression models that use the selected condition quantity as a dominant variable thereof. The first yet-to-be processed mathematical expression model that is spotted is paired with the next mathematical expression model that uses the same condition quantity as a dominant variable thereof. Finally, a decision is made as to whether or not the processing in steps S306 through S309 has been completed for all pairs of mathematical expression models sharing the dominant condition quantity. If the calculation for all the pairs of mathematical expression models has been completed ("yes" in step S310), i.e., if all the pairs of mathematical expression models that use the condition quantity selected in step S304 as a dominant variable thereof have been processed, the operation returns to step S303. If there are any data buffered in the output standby state in step S309, the data may be output to the threshold value determining unit 105 at this time. If, on the other hand, the calculation for all the mathematical expression model pairs has not yet been completed, there may still be mathematical expression models to be selected and, accordingly, the operation returns to step S305 to execute the calculation described above again ("no" in step S310).

If it is decided in step S303 that there is no more yet-to-be processed condition quantity among the condition quantities used as dominant variables in the mathematical expression models in the list created in step S302 ("no" in step S303), the threshold candidate value generation processing by the threshold value calculation unit 104 ends.

The threshold value determining unit 105 determines threshold values for various condition quantities based upon threshold candidate values input from the threshold value calculation unit 104. The threshold values thus determined are output to the mathematical expression model table 108. The threshold value determining unit 105 has a storage area (not shown) in which the threshold candidate values provided by the threshold value calculation unit 104 are stored.

Figure 4:
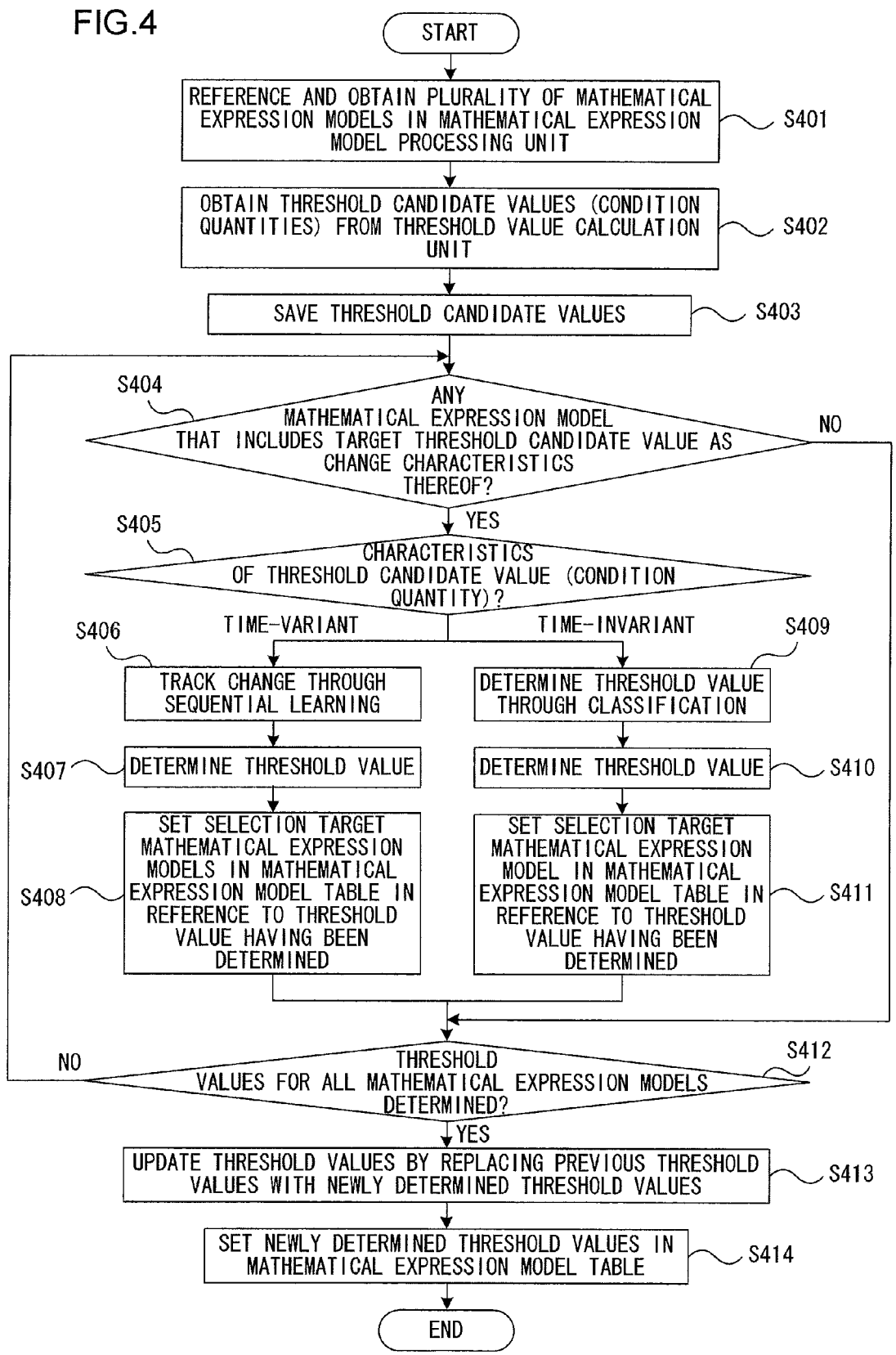
FIG. 4 presents a flowchart of the threshold value determination processing.

FIG. 4 presents a flowchart of threshold value determination processing executed when determining threshold values for the individual condition quantities based upon the threshold candidate values having been input from the threshold value calculation unit 104. First, a plurality of mathematical expression models in the mathematical expression model processing unit 106 are obtained from the mathematical expression model variable table 111 in the mathematical expression model table 108 (step S401). Next, the threshold candidate values output from the threshold value calculation unit 104 are obtained (step S402) and the threshold candidate values acquired at this time are saved into the area where all the threshold candidate values to date are saved (step S403). If a memory capacity upper limit is set for the area used to save the threshold candidate values, representative values, e.g., average values, may be saved instead of all the previous threshold candidate values.

Next, in step S404, the condition quantity corresponding to a given threshold candidate is selected and a decision is made as to whether or not there is any mathematical expression model, the error of which will be affected by the selected threshold candidate condition quantity. If there is any mathematical expression model, the error of which will fluctuate as the threshold candidate condition quantity fluctuates, the mathematical expression model is assigned to a specific type of processing in step S405 depending upon the characteristics of the threshold candidate condition quantity, i.e., whether the threshold candidate is a time-variant threshold candidate (a condition quantity that fluctuates over time) or a threshold candidate that is time-invariant (a condition quantity that should not fluctuate over time). Each condition quantity is categorized either as time-variant or time-invariant in the mathematical expression model table 108, as described in detail later, and thus, the decision as to whether or not the threshold candidate condition quantity is time-variant or time-invariant can be made by referencing the mathematical expression model table 108. If the threshold candidate condition quantity is a time-variant condition quantity, the operation shifts into step S406, in which a gain is set for a sequential learning method incorporating the previous threshold candidate values, e.g., the Kalman filter method or the method of least squares, so as to be able to closely track fluctuations of the threshold value occurring over time. In step S407, the value ultimately output by tracking the threshold value through the sequential learning method in step S406 is designated as the threshold value. Next, in step S408, a mathematical expression model, the error of which will decrease when the condition quantity is greater than the threshold value determined in step S407, and a mathematical expression model, the error of which will decrease when the condition quantity is less than the threshold value determined in step S407, are selected, and the numbers representing the selected mathematical expression models are each set as a target element in a relevant row or column in the mathematical expression model table 108. In the example presented in FIG. 2, the error of mathematical expression model 2 will be smaller when the value representing the condition quantity for which the threshold value is set is less than the value B and, accordingly, "2" will be set as an element in the mathematical expression model table, whereas the error of mathematical expression model 1 will be smaller when the value representing the condition quantity for which the threshold value is set, is greater than the value B and, accordingly, "1" will be set as an element in the mathematical expression model table.

If, on the other hand, the threshold candidate condition quantity is not a time-variant condition quantity, the operation shifts into step S409, in which a threshold value is determined by taking the average of threshold candidate values or by adopting a clustering method whereby the threshold candidate values to date are divided into two groups, such as the support vector machine method described by Christopher M. Bishop in his "Pattern Recognition and Machine Learning Volume 2", published by Springer Japan, on Jul. 1, 2008, ISBN: 9784431100317. In step S410, the value finally output through the processing in step S409 is designated as the threshold value. Next, in step S411, a mathematical expression model, the error of which will decrease when the condition quantity is greater than the threshold value determined in step S410, and a mathematical expression model, the error of which will decrease when the condition quantity is less than the threshold value determined in step S410, are selected and the numbers representing the selected mathematical expression models are each set as a target element in a relevant row or column in the mathematical expression model table 108.

Next, it is verified in step S412 that the threshold values have been determined for all the mathematical expression models through the processing in step S407 or step S410, since the mathematical expression models are each allowed to include a plurality of threshold values (condition quantities) and thus it will not be enough to determine a single threshold value (condition quantity) for a given mathematical expression model. If the threshold values for all the mathematical expression models have not been determined, i.e., if there is a method mathematical expression model for which all the necessary threshold values have not been determined, the operation returns to step S404, to further determine a threshold value. If it is decided that the threshold values have been determined for all the mathematical expression models, the operation proceeds to step S413 to update the threshold values by deleting the previously designated threshold values and replacing them with the new values calculated through step S407 or step S410. Finally, the newly designated threshold values are set in the mathematical expression model table 108 in step S414. Through the processing described above, a threshold value is determined in correspondence to each condition quantity for which a threshold candidate value has been calculated and thus, at least one threshold value will be designated for all the mathematical expression models in the mathematical expression model processing unit 106.

FIG. 9 shows the structure of the mathematical expression model table 108. In the table, mathematical expression model condition quantities that are crucial factors in determining the extents of error are listed along the vertical direction. These condition quantities are time-variant condition quantities calculated by the probability model filtering processing unit 103. The mathematical expression models needed to determine the extents of error will be used in, for instance, an observation equation if the probability model filter processing unit 103 uses a Kalman filter.

If a mathematical expression model manifesting a significant modeling error at low speed is among the mathematical expression models needed to determine the extents of error, there will be two distinct states, i.e., a low-speed traveling state and a high-speed traveling state corresponding to a large extent of error and a small extent of error. The extent of modeling error will be determined by which traveling state the vehicle is currently in. Condition quantities indicating the internal conditions in the probability model are entered along the horizontal direction. These are primarily condition quantities calculated based upon the condition quantities calculated by the probability model filtering processing unit 103 and are time-invariant condition quantities. A condition quantity included in the vertical list used for mathematical expression model categorization may be also included among the condition quantities listed along the horizontal direction as long as it indicates an internal condition in the probability model by regarding that its fluctuation occurring over time is insignificant.

The time-invariant condition quantities calculated by the probability model filtering processing unit 103 may include, for instance, an error in a sensor mounting angle. Such a condition quantity will be one of the condition quantities listed along the horizontal direction, and in correspondence to this condition quantity, two states, i.e., learning complete and learning incomplete, will exist. A decision as to whether or not the learning process has been completed will be made through calculation executed separately from the filtering processing in the probability model filtering processing unit 103. In the example described above, the extent to which the sensor mounting angle error fluctuates, i.e., the stage to which the learning process has advanced, can be expressed as a numerical value by dividing a predetermined variance value by a variance value of the results of error calculation executed to determine the sensor mounting angle error occurring within a specific length of time. This numerical value is referred to as a learning level, and a decision as to whether or not the learning process has been completed, is made by using a specific value designated as a threshold value. Such condition quantities indicating internal states further include a gyro sensor bias learning level, a scale factor learning level and a steering angle characteristics learning level. Once the learning level reaches or exceeds 1, the learning process is theoretically considered to have been completed.

Models representing an optimal combination of the conditions corresponding to the condition quantities selected from the lists running along the vertical axis and the horizontal axis are set in the mathematical expression model table 108. These optimal models are the mathematical expression models selected in step S408 or step S411. The mathematical expression model processing unit 106 may hold a plurality of mathematical expression models that are not mutually exclusive. For this reason, a plurality of mathematical expression models may be set in correspondence to the conditions selected from the list running along the vertical direction and the horizontal direction within the mathematical expression model table 108.

The threshold values having been saved in step S413 are each set as a threshold value along the vertical axis or the horizontal axis in step S414. Assuming that the threshold values set in step S414 are "speed 10 km/h" and "sensor mounting angle learning level 0.1", the low-speed traveling state and the high-speed traveling state indicated along the horizontal axis will be respectively less than 10 km/h and equal to or above 10 km/h. Likewise, if the sensor mounting angle learning level is equal to or less than 0.1, "learning incomplete" will be set and if the sensor mounting angle learning level is greater than 0.1, "learning complete" will be set along the horizontal direction.

Figure 6:
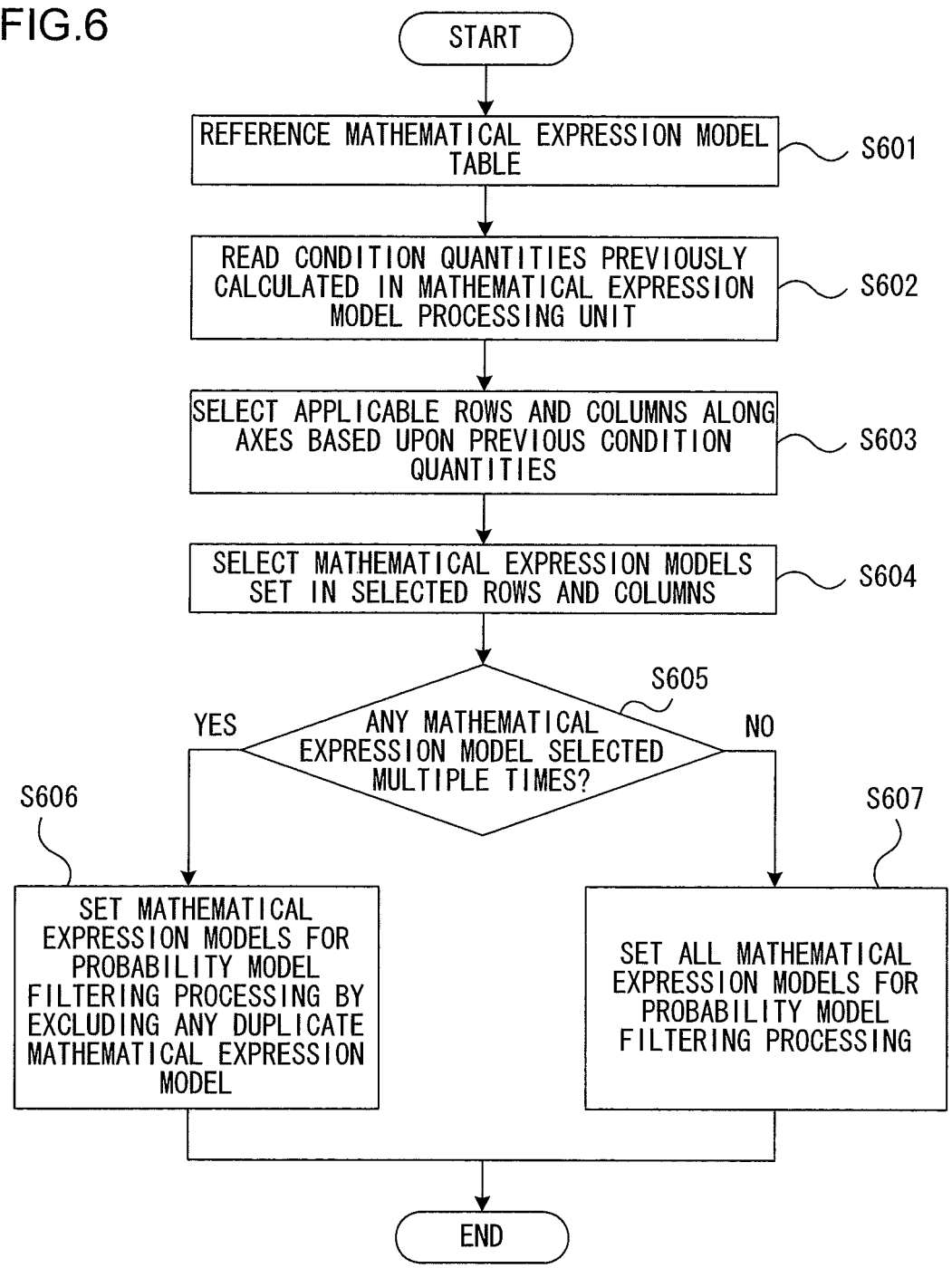
FIG. 6 presents a flowchart of the mathematical expression model selection processing.

The mathematical expression model selection unit 107 selects a plurality of mathematical expression models best suited for the current vehicle conditions based upon the mathematical expression model table 108 created by the threshold value determining unit 105. FIG. 6 presents a flowchart of the processing executed by the mathematical expression model selection unit 107 to select a plurality of optimal models among the plurality of mathematical expression models in the mathematical expression model processing unit 106. First, the mathematical expression model table 108 is read in step S601. Next, the condition quantities indicating the vehicle behavior, attitude and conditions, having been calculated in the most recent past by the mathematical expression model processing unit 106 are read (step S602). Then, a decision is made as to whether each of the condition quantities having been read belongs to the vertical threshold value list or the horizontal threshold value list set in the mathematical expression model table 108 and a row and a column along which conditions matching the values indicating the vehicle conditions (condition quantities) calculated in correspondence to the vertical axis and the horizontal axis are listed are selected from the mathematical expression model table 108 (step S603). A plurality of rows and a plurality of columns may be selected in this step. In step S604, the optimal mathematical expression models for the corresponding conditions, set in the selected row and column, are read.

Next, in step S605, a verification is executed to check whether or not the mathematical expression models selected in step S604 include any mathematical expression model that has been selected more than once, and if there is a mathematical expression model that has been selected multiple times, the operation shifts into step S606 to first clear the duplicate mathematical expression model and then set the selected mathematical expression models as calculation processing targets to undergo the calculation processing in the mathematical expression model processing unit 106. In other words, it is ensured that a given equation will never be processed multiple times by the mathematical expression model processing unit 106. If it is decided in step S605 that no mathematical expression model has been selected multiple times, the operation shifts into step S607 to set all the mathematical expression models having been selected as processing targets for the mathematical expression model processing unit 106.

The mathematical expression model processing unit 106 calculates the position and other condition quantities by using the mathematical expression models having been selected by the mathematical expression model selection unit 107 alone. Assuming that the mathematical expression model processing unit 106 manages a total of N mathematical expression models, the mathematical expression model selection unit 107 will select n mathematical expression models among the N mathematical expression models (n is a value equal to or smaller than N). In the mathematical expression model processing unit 106, a probability model state equation or a probability model observation equation corresponding to the n mathematical expression models having been selected by the mathematical expression model selection unit 107 is configured and the position and other condition quantities are calculated by using a probability model filter such as a Kalman filter. A predetermined number of values indicating the position and the other condition quantities, are calculated at this time, and this predetermined number is selected irrespective of the number of mathematical expression models selected by the mathematical expression model selection unit 107. The probability model filter calculation executed based upon mathematical expressions with lesser extents of error selected as described above assures better accuracy in the condition quantity estimation than that achieved by using all the mathematical expression models, some of which are bound to include information with significant errors, for condition quantity estimation. The mathematical expression models may be set in the mathematical expression model processing unit 106 as described below.

The following explanation is given by assuming that mathematical expression model 1, mathematical expression model 2, and mathematical expression model 3, among the N mathematical expression models in the mathematical expression model processing unit 106, have been selected by the mathematical expression model selection unit 107. Mathematical expression model 1 is expressed as in (expression 1), mathematical expression model 2 is expressed as in (expression 2) and mathematical expression model 3 is expressed as in (expression 3) below. $C_i$ represents an observation value corresponding to mathematical expression model i, (x, y, z) represents all the condition quantities output from the probability model filtering processing unit 103 and $A_{i1}$ to $A_{i3}$ each represent a coefficient of one of the condition quantities in mathematical expression model i.

$$C_1 = A_{11}x + A_{12}y + A_{13}z \qquad \text{(expression 1)}$$

$$C_2 = A_{21}x + A_{22}y + A_{23}z \qquad \text{(expression 2)}$$

$$C_3 = A_{31}x + A_{32}y + A_{33}z \qquad \text{(expression 3)}$$

When these mathematical expression models are used in an observation equation constituting a Kalman filter, the observation equation can be expressed as in (expression 4) below provided that all the mathematical expression models, with no model among them having been selected multiple times, are set in step S607.

$$C = Ax \qquad \text{(expression 4)}$$
$$\begin{pmatrix} C_1 \\ C_2 \\ C_3 \end{pmatrix} = \begin{pmatrix} A_{11} & A_{12} & A_{13} \\ A_{21} & A_{22} & A_{23} \\ A_{13} & A_{32} & A_{33} \end{pmatrix} \begin{pmatrix} x \\ y \\ z \end{pmatrix}$$

The coefficients set in correspondence to the condition quantities (x, y, z) used in the individual mathematical expression models are read from the mathematical expression model variable table 111 and set as elements ($A_{11}$ to $A_{33}$) of an observation matrix A. It is assumed that if no coefficient is set in the mathematical expression model variable table 111 for a given condition quantity, 0 will be set for that element. In the actual program, various elements ($A_{11}$ to $A_{33}$) of the observation matrix A, in which the coefficients of the condition quantities corresponding to the selected mathematical expression models are grouped together, will be set in conjunction with an "if" statement for use in the Kalman filter.

If mathematical expression model 1 and mathematical expression model 2, among the N mathematical expression models in the mathematical expression model processing unit 106, have been selected by the mathematical expression model selection unit 107, an observation equation expressed as in (expression 5) below will be likewise configured, with various elements ($A'_{11}$ to $A'_{23}$) in the observation matrix A' set in a similar manner.

$$C' = A'x \qquad \text{(expression 5)}$$
$$\begin{pmatrix} C'_1 \\ C'_2 \end{pmatrix} = \begin{pmatrix} A'_{11} & A'_{12} & A'_{13} \\ A'_{21} & A'_{22} & A'_{23} \end{pmatrix} \begin{pmatrix} x \\ y \\ z \end{pmatrix}$$

As in (expression 4), the coefficients set in correspondence to the condition quantities (x, y, z) used in the individual mathematical expression models will be read from the mathematical expression model variable table 111 and set as elements ($A'_{11}$ to $A'_{23}$) in the observation matrix $A'$.

Assuming that this positioning device is adopted in a car navigation system equipped with a steering angle sensor and a gyro sensor, that a speed-based Ackerman model and a speed-based dead-reckoning model are used as the mathematical expression models and that an extended Kalman filter is used in the probability model filter processing unit 103, the operation of the positioning device is described in specific detail.

In the Ackerman model, which is a mathematical expression model valid in a low-speed range, the angular speed ω is expressed as in (expression 6) below with the vehicle speed v, the actual steering angle δ and the distance l between the front axle and the rear axle.

$$\omega = \sigma \cdot \delta / l \qquad \text{(expression 6)}$$

In the dead-reckoning model, the angular speed is calculated by using an output value $\omega_{gyro}$ provided by the gyro sensor, and accordingly, the angular speed ω is calculated as expressed in (expression 7) below with a gyro sensor sensitivity coefficient S and a bias.

$$\omega = S \cdot \omega_{gyro} + \text{bias} \qquad \text{(expression 7)}$$

The position and the azimuth (x, y, θ) of the vehicle within the two-dimensional plane can be calculated as expressed in the following expression (expression 8) based upon the speed v in correspondence to a given time point t and a unit time Δt.

$$\begin{pmatrix} x(t+1) \\ y(t+1) \\ \theta(t+1) \end{pmatrix} = \begin{pmatrix} x(t) \\ y(t) \\ \theta(t) \end{pmatrix} + \begin{pmatrix} \cos\theta(t) \\ \sin\theta(t) \\ \omega(t) \end{pmatrix} v\Delta t \qquad \text{(expression 8)}$$

Thus, the speed v can be designated as a condition quantity to be used as a dominant variable in conjunction with these two mathematical expression models. While the Ackerman model is valid in a low-speed range as explained earlier, the maximum speed level at which the validity of the model holds varies depending upon the particulars of the vehicle and the current road characteristics. The device determines a speed threshold value, i.e., the speed limit at which the validity of the Ackerman model is sustained, through the method described earlier.

The equation in (expression 8) constitutes part of the state equation in the extended Kalman filter, whereas the equation in (expression 6) and (expression 7) constitutes part of the observation equation in the extended Kalman filter. In this example, with (x(t), y(t), θ(t)) representing the position (x, y) and the azimuth θ at the given time point t, the probability model filtering processing unit 103 outputs the following condition quantities; the position (two-dimensional), the azimuth, the speed and the angular speed.

(x(t), y(t), θ(t)), v(t), ω(t)) represents the condition quantities calculated at the given time point t by the probability model filtering processing unit 103 with the extended Kalman filter by using the dead-reckoning model expressed in (expression 7). Among the condition quantities having been calculated, the speed v(t) needed as a criterion for a switchover between the Ackerman model and the dead-reckoning model is output to the threshold value calculation unit 104. The differences between the angular speed value calculated by the probability model filtering processing unit 103 by using the extended Kalman filter and the observation value calculated by using the Ackerman model as expressed in (expression 6) and between the angular speed value calculated by using the extended Kalman filter and the observation value calculated by using the dead-reckoning model as expressed in (expression 7) are output to the threshold value calculation unit 104 respectively as an Ackerman model error and a dead-reckoning model error.

Figure 7:
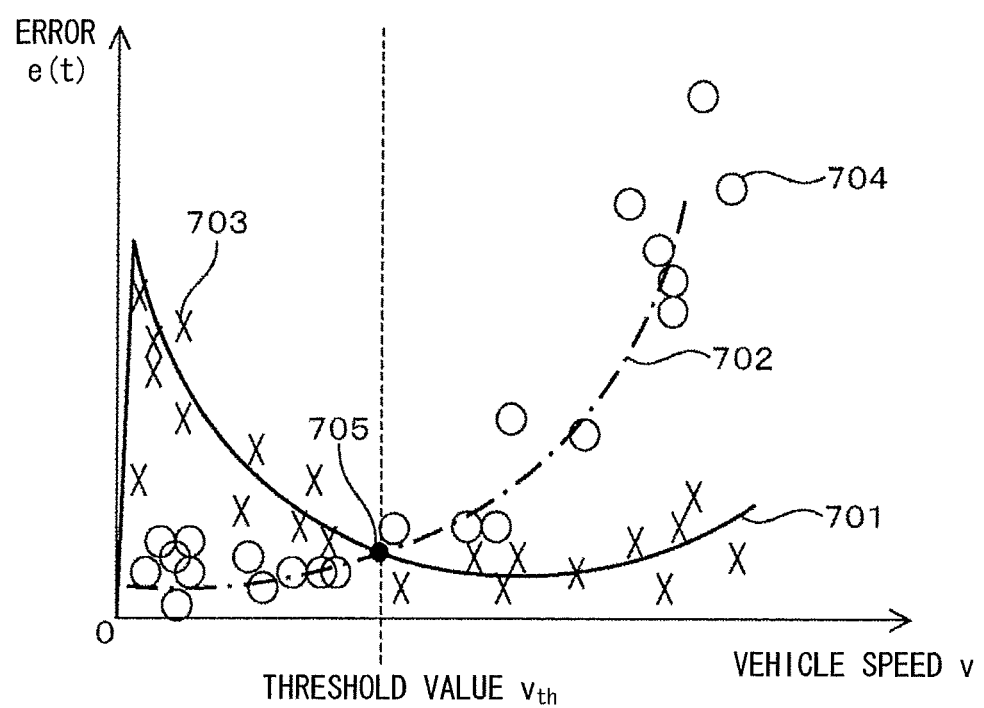
FIG. 7 indicates changes in the error relative to the vehicle speed in an Ackermann-based mathematical expression model and a dead-reckoning mathematical expression model.

The threshold value calculation unit 104 determines through approximation a curve representing the relation of the value indicating the error of each mathematical expression model to the vehicle speed v by using the speed v(t) and the error value e(t) corresponding to the particular mathematical expression model, having been input thereto from the probability model filtering processing unit 103 up to the time point t. As a result, a graph such as that shown in FIG. 7, with the error indicated along the vertical axis and the vehicle speed v indicated along the horizontal axis, is generated. In the example presented in FIG. 7, a curve 701 represents the dead-reckoning model error and a curve 702 represents the Ackerman model error. The graph is created by determining through approximation curves respectively connecting points 703, indicated by X marks, representing the speed-related error of the dead-reckoning model, plotted up to the time point t and connecting point 704, indicated by O marks representing the speed-related error of the Ackerman model, plotted up to the time point t.

The speed value assumed at a point 705 at which the curve 701 and the curve 702 intersect each other is output as a threshold candidate value $v_{th}$ to the threshold value determining unit 105. Since the threshold candidate value $v_{th}$ thus calculated has time-variant characteristics which are affected by factors such as the extent to which the tires are worn, changes in the road characteristics and the like, change-tracking processing executed through sequential learning is selected in step S405.

Figure 8:
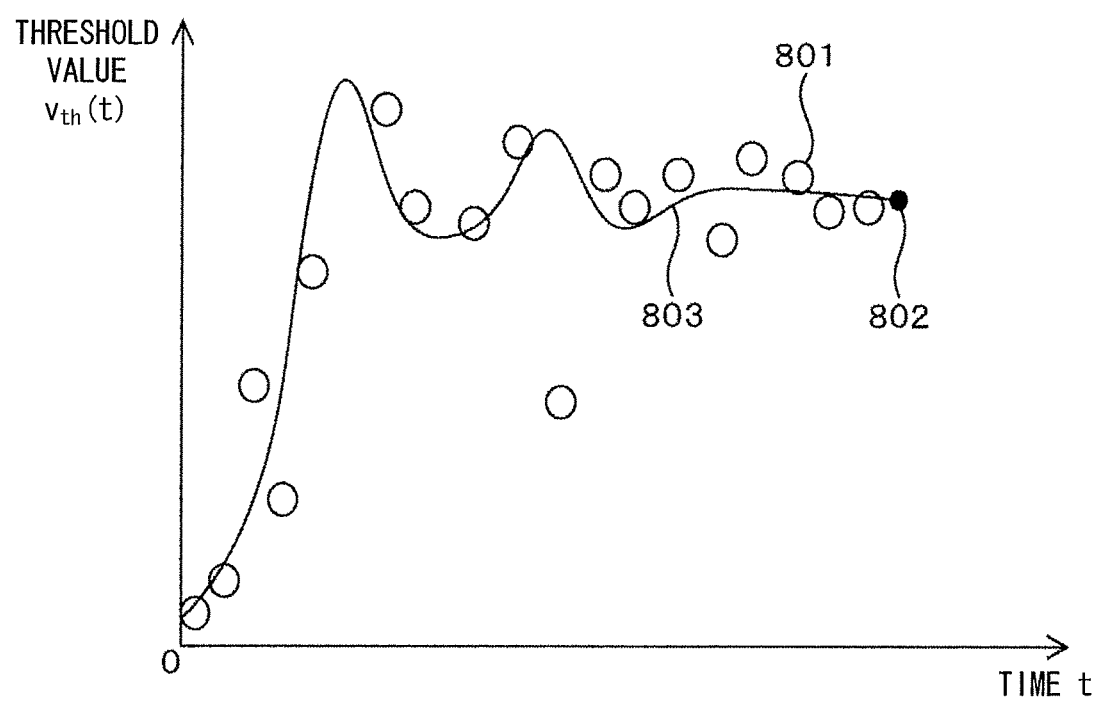
FIG. 8 shows the change in the threshold value $v_{th}$ occurring over time.

The change having occurred in the threshold candidate value up to the time point t may be plotted as points 801 indicated by O marks in FIG. 8. The change in the threshold value $v_{th}(t)$ can be expressed as threshold value change characteristics with the following two expressions (expression 9) and (expression 10) with a time constant τ.

$$v_{th}(t+1) = (\tau - \Delta t)/\tau \cdot v_{th}(t) \qquad \text{(expression 9)}$$

$$v_{th}(t) = v_{th} \qquad \text{(expression 10)}$$

$v_{th}$ in the right side of (expression 10) is the current threshold candidate value input from the threshold value calculation unit 104.

By configuring a Kalman filter with (expression 9) used as a state equation and (expression 10) used as an observation equation, a threshold value $v_{th}(t)$ 802 can be determined for the current session. A curve 803 in FIG. 8 indicates the value constantly and sequentially determined as the threshold. The threshold value $v_{th}(t)$ 802 thus determined is set in the mathematical expression model table 108. The mathematical expression model table 108 in FIG. 9 includes the Ackerman model assigned with mathematical expression model ID No. 1 and the dead-reckoning model assigned with mathematical expression model ID No. 2. The state in which the speed is lower than the threshold value $v_{th}(t)$ 802 can be defined as a low-speed traveling state, whereas the state in which the speed is higher than the threshold value $v_{th}(t)$ 802 can be defined as a high-speed traveling state. The values "1", "2" . . . in the figure each indicate the ID number used to identify the corresponding mathematical expression model in the mathematical expression model processing unit 106, whereas the symbol "/" indicates that either mathematical expression model is applicable. Next, the mathematical expression model selection unit 107 selects applicable rows and columns in the mathematical expression model table 108, corresponding to the condition quantities having been calculated by the probability model filtering processing unit 103 in the immediately preceding session, by referencing the mathematical expression model table 108. Assuming that the condition quantities having been output from the probability model filtering processing unit 103 through the immediately preceding session are the gyro bias, the gyro scale factor, the sensor mounting angle and the steering angle characteristics and that the respective learning levels have been calculated as "learning complete" for the gyro bias learning level, "learning complete" for the gyro scale factor learning level, "learning incomplete" for the sensor mounting angle learning level and "learning complete" for the steering angle characteristics learning level, the columns enclosed in dotted-line frames 901 in FIG. 9 are selected. It is also assumed that the following relationship expressed in (expression 11) exists with regard to the speed v(t) having been calculated by the probability model filtering processing unit 103 through the immediately preceding session.

$$v(t) = v_{th}(t) \quad \text{(expression 11)}$$

In this situation, the vehicle is known to have been in the low-speed traveling state during the immediately preceding session, and thus, the row enclosed in a solid-line frame 902 in FIG. 9 is the selected row. Accordingly, the table elements enclosed in both a dotted-line frame 901 and the solid-line frame 902 each indicate a mathematical expression model that should be selected at this time and, since all the elements are assigned with ID No. 1, the Ackerman model, i.e., mathematical expression model 1, alone is selected. Consequently, an observation equation constituted with the Ackerman model alone is used as the observation equation in the extended Kalman filter at the probability model filtering processing unit 103 at a time point t+1.

The mathematical expression model processing unit 106 executes calculation by using different mathematical expression models depending upon whether the steering angle sensor or the gyro sensor is used. Whenever the mathematical expression model selection unit 107 switches over from the Ackerman model to the dead-reckoning model or vice versa to select the alternative mathematical expression model to be used in the calculation executed by the mathematical expression model processing unit 106, the corresponding sensor is selected simultaneously as the mathematical expression model switchover occurs. Subsequently, the mathematical expression model processing unit 106 executes calculation by using the mathematical expression model having been selected through the switchover.

Second Embodiment

Operation of the positioning device is next described in reference to an example in which the positioning device is adopted in a car navigation system equipped with GPS and a gyro sensor and mathematical expression models are switched so as to select a sensor fusion model when the GPS is used and select a dead-reckoning model when no GPS signals are received or the GPS is not used.

The sensor fusion model enables estimation of the most likely position by fusing, as described above, via an extended Kalman filter, the GPS position and the dead-reckoning position provided by an internal sensor such as a gyro sensor. An internal sensor model outputs the dead-reckoning position detected by an internal sensor such as a gyro sensor as described above. The state equation in the extended Kalman filter used in the embodiment is assumed to be identical to that expressed in (expression 8). The sensor fusion model expressed in (expression 12) and the internal sensor model expressed in (expression 13) are both mathematical expression models in the observation equation.

$$\begin{pmatrix} x(t) \\ y(t) \\ \theta(t) \end{pmatrix} = \begin{pmatrix} x_{gps}(t) \\ y_{gps}(t) \\ \theta_{gps}(t) \end{pmatrix} \quad \text{(expression 12)}$$

$$\begin{pmatrix} x(t) \\ y(t) \\ \theta(t) \end{pmatrix} = \begin{pmatrix} x(t) \\ y(t) \\ \theta(t) \end{pmatrix} \quad \text{(expression 13)}$$

As explained earlier, the sensor fusion model is valid when the GPS is used. Within a premise that "the GPS is used if the distance between the currently estimated position and the GPS position is small", there is normally bound to be a time-invariant threshold value between the sensor fusion model and the internal sensor model. Accordingly, the positioning device determines a threshold value constituting a criterion for validating the sensor fusion model through the method described earlier by designating a distance limit for the distance between the currently estimated position and the GPS position as a condition quantity to be used as a dominant variable in the processing.

The probability model filtering processing unit 103, which uses the extended Kalman filter, is first examined. As explained earlier, the equation in (expression 8) constitutes part of the state equation in the extended Kalman filter, whereas the equations in (expression 12) and (expression 13) constitute part of the observation equation in the extended Kalman filter. In this example, with (x(t), y(t), θ(t)) representing the position and the azimuth at a given time point t, the probability model filtering processing unit 103 outputs the following condition quantities; the position (two-dimensional) and the azimuth.

(x(t), y(t), θ(t)) represents the condition quantities calculated at the given time point t by the probability model filtering processing unit 103 with the extended Kalman filter by using the internal sensor model expressed in (expression 13). Based upon these condition quantities having been calculated, the distance L between the currently estimated position and the GPS position, to be used as a criterion for switching over between the sensor fusion model and the internal sensor model, is calculated as expressed in (expression 14) below.

$$L = \sqrt{(x(t) - x_{gps}(t))^2 + (y(t) - y_{gps}(t))^2} \quad \text{(expression 14)}$$

The distance L calculated as expressed in (expression 14) is then output to the threshold value calculation unit 104. The differences between the estimated position calculated by the probability model filtering processing unit 103 by using the extended Kalman filter and the observation value calculated by using the sensor fusion model as expressed in (expression 12) and between the estimated position value calculated by using the extended Kalman filter and the observation value calculated by using the internal sensor model as expressed in (expression 13) are output to the threshold value calculation unit 104 respectively as a sensor fusion model error and an internal sensor model error.

Figure 10:
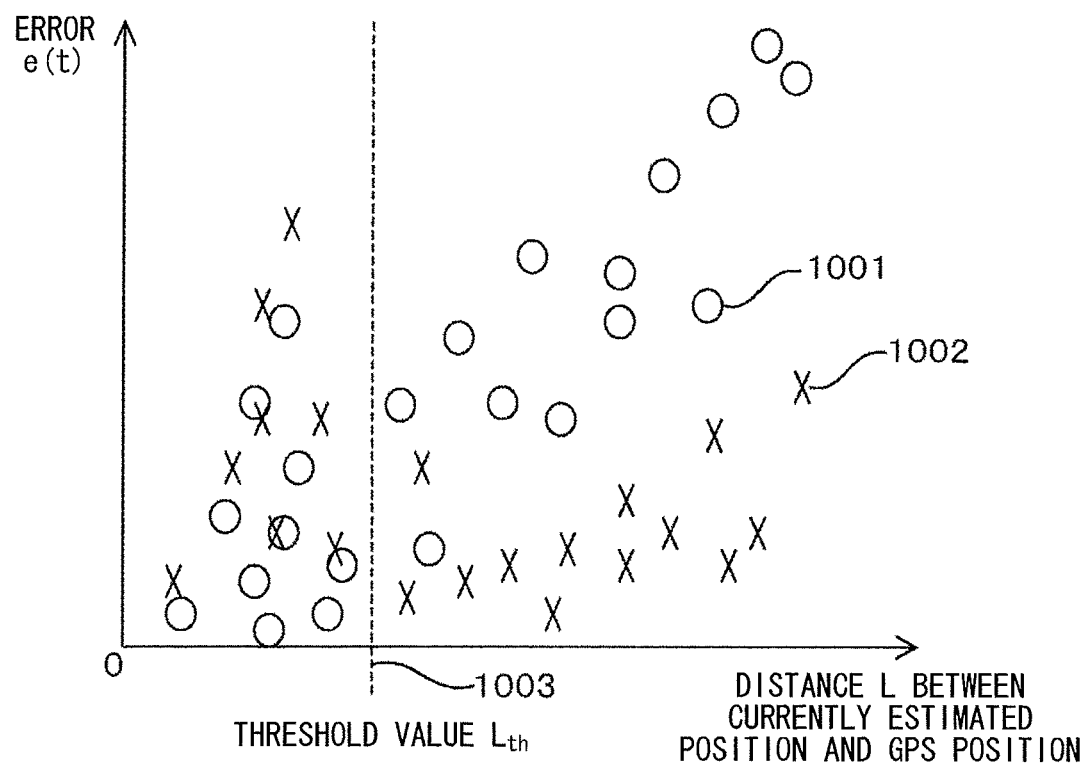
FIG. 10 indicates changes in the error in a sensor-fusion mathematical expression model and a internal-sensor mathematical expression model.

The threshold value calculation unit 104 is able to generate a distribution graph such as that shown in FIG. 10, by using the distance L(t) between the currently estimated position and the GPS position and the error e(t) of the respective model having been input from the probability model filtering processing unit 103 up to the time point t. The error is indicated along the vertical axis, whereas the distance L between the currently estimated position and the GPS position is indicated along the horizontal axis. Points 1001 indicated by O marks in FIG. 10 each represent the sensor fusion model error relative to the position estimated by the probability model filtering processing unit 103, whereas points 1002 indicated by X marks in FIG. 10 each represent the internal sensor model error relative to the position estimated by the probability model filtering processing unit 103. These points are divided into two groups with a given value $L_{th}$ set as a cutoff point by using the support vector machine mentioned earlier. This value $L_{th}$ is output to the threshold value determining unit 105 where it is saved as a threshold candidate value $L_{th'}$.

The threshold determining unit 105 designates the average of the threshold candidate value corresponding to the time point t and the threshold candidate values having been calculated up to the time point t as a current threshold value $L_{th}(t)$. The threshold value $L_{th}(t)$ thus determined is set in the mathematical expression model table 108.

The mathematical expression model table 108 in FIG. 11 includes the sensor fusion model assigned with mathematical expression model ID No. 5 and the internal sensor model assigned with mathematical expression model ID No. 6. With this mathematical expression model expression table 108, specific settings, i.e., a GPS reception setting selected so as to fuse the GPS position when the distance between the currently estimated position and the GPS position is less than the threshold value $L_{th}(t)$ and a GPS non-reception setting selected so as to disregard the GPS position when the distance greater than the threshold value is output, are defined.

Next, the mathematical expression model selection unit 107 selects applicable rows and columns in the mathematical expression model table 108, corresponding to the condition quantities having been calculated by the probability model filtering processing unit 103 in the immediately preceding session, by referencing the mathematical expression model table 108. Assuming that the condition quantities having been output from the probability model filtering processing unit 103 through the immediately preceding session are the gyro bias, the gyro scale factor, the sensor mounting angle and the steering angle characteristics and that the respective learning levels have been calculated as "learning complete" for the gyro bias learning level, "learning complete" for the gyro scale factor learning level, "learning incomplete" for the sensor mounting angle learning level and "learning complete" for the steering angle characteristics learning level, the columns enclosed in dotted-line frames 1101 in FIG. 11 are selected. It is also assumed that the following relationship expressed in (expression 15) exists with regard to the distance L(t) between the estimated position and the GPS position having been calculated by the probability model filtering processing unit 103 through the immediately preceding session.

$$L(t) < L_{th}(t) \quad \text{(expression 15)}$$

In this situation, since the current setting is known to be the GPS reception setting, and thus, the row enclosed in a solid-line frame 1102 in FIG. 11 is the selected row. Accordingly, the table elements enclosed in both a dotted-line frame 1101 and the solid-line frame 1102 each indicate a mathematical expression model that should be selected at this time, and since all the elements are assigned with ID No. 5, the sensor fusion model, i.e., mathematical expression model 5, alone is selected. Consequently, (expression 12) alone is used as the observation equation in the extended Kalman filter at the probability model filtering processing unit 103 at a time point t+1.

Third Embodiment

The operational procedure of the positioning device is described in reference to an example in which the positioning device is adopted in a car navigation system equipped with digital map information, a GPS, a gyro sensor and an attitude sensor such as an acceleration sensor and capable of locating the subject vehicle position on the digital map through map matching, and mathematical expression models are switched to select a sensor fusion model (hereafter to be referred to as a link fusion model) to be used in conjunction with link information included in the digital map data or a sensor fusion model (hereafter referred to as an INS model) when the link information in the digital map data is not utilized.

It is assumed that the digital map data are managed in units of meshes ranging over a predetermined area. The meshes in the map each include points (nodes) with coordinates so as to express shapes of roads. A specific number is assigned to each node (node point number) for identification purposes. The X coordinate of a given node indicates the longitudinal reading of the node, whereas the Y coordinate of the node indicates the latitudinal reading of the node. The distance between two successive nodes is referred to as a node link length, the width of a given road is referred to as a node link width and both the node link length and the node link width are indicated in units of meters.

The link fusion model, which is a mathematical expression model that uses links in the digital map data in the Kalman filter observation equation as explained earlier, can be expressed as in (expression 16) below with the slope a of a link, a link intercept c, the distance r from the link and the slope Ø to the link.

$$\begin{pmatrix} 0 \\ 0 \end{pmatrix} = \begin{pmatrix} x(t)\sin\alpha - y(t)\cos\alpha - c - r \\ \alpha - \theta - \phi \end{pmatrix} \quad \text{(expression 16)}$$

As the "0" in the left side of (expression 16) indicates, the link fusion model assumes that the vehicle is currently present on a link so that, if there is an error in the map information, the position output from the probability model filtering processing unit 103, too, may also contain a significant error.

In the INS model, an angular speed value from the gyro sensor and an acceleration value from the acceleration sensor are obtained and converted respectively to an azimuth and a speed by being integrated. While the angular speed is calculated as expressed in (expression 7), the acceleration ACC may be calculated as expressed in (expression 17) below.

$$ACC = S_{acc} \cdot G_{Gsns} \cdot g \cdot \sin Ø + \text{bias} \quad \text{(expression 17)}$$

$S_{acc}$ represents the sensitivity coefficient of the accelerator sensor, $G_{Gsns}$ represents the raw output value from the acceleration sensor, g represents the gravitational acceleration and Ø represents the sensor mounting angle.

The state equation configured with the link fusion model and the INS model is identical to that in (expression 8).

The link fusion model, which is bound to manifest a significant error if there is an error in the map information, as described earlier, should not be used with erroneous map information. Accordingly, on the premise that "map information is used when the distance between the GPS position and the link is small" by assuming that a position that can be considered roughly correct is output as the GPS position, a time-invariant threshold value, under normal circumstances, is bound to exist between the link fusion model and the INS model. There may be a situation in which the GPS position itself has an error and thus, better accuracy can be assured if the GPS position is not used, as has been explained in reference to the second embodiment. Accordingly, the distance between the GPS position and the link is defined as a map error quantity, i.e., a condition quantity, is used as a dominant variable. A threshold value to be used as a criterion for validating the link fusion model is determined for the map error quantity and a threshold value is further determined by taking into consideration the GPS reception position, as in the second embodiment.

The probability model filtering processing unit 103 that uses the extended Kalman filter is first examined. As explained earlier, the equation in (expression 8) constitutes part of the state equation in the extended Kalman filter, whereas the equation in (expression 16) and (expression 7) and (expression 17) constitute part of the observation equation in the extended Kalman filter. In this example, with (x(t), y(t), θ(t)) represents the position and the azimuth at a given time point t, the probability model filtering processing unit 103 outputs condition quantities; the position (two-dimensional) and the azimuth.

(x(t), y(t), θ(t)) represents the condition quantities calculated at the given time point t by the probability model filtering processing unit 103 with the extended Kalman filter by using the internal sensor model expressed in (expression 13). In this situation, a link equation such as that in (expression 18) can be written based upon the X coordinates and the Y coordinates of the nodes at the two ends of the link matched through the map matching operation executed by the subject vehicle position estimation device 102, as described earlier.

$$x \sin \alpha - y \cos \alpha = c \quad \text{(expression 18)}$$

The distance $r_{GPS}$ between the currently estimated position (at the time point t) and the link, needed for switchover between the link fusion model and the INS model, which is a distance between a point (the GPS position) and a straight line (the link equation in (expression 18)), can be calculated as follows.

$$r_{GPS} = x_{gps}(t) \sin \alpha - y_{gps}(t) \cos \alpha - c \quad \text{(expression 19)}$$

The distance $r_{GPS}$ calculated as expressed in (expression 19) is then output to the threshold value calculation unit 104. The differences between the estimated position value calculated by the probability model filtering processing unit 103 by using the extended Kalman filter and the observation value calculated by using the link fusion model as expressed in (expression 16) and between the estimated position value calculated by using the extended Kalman filter and the observation value calculated by using the INS model as expressed in (expression 7) and (expression 17) are output to the threshold value calculation unit 104 respectively as a link fusion model error and an INS model error.

Figure 12:
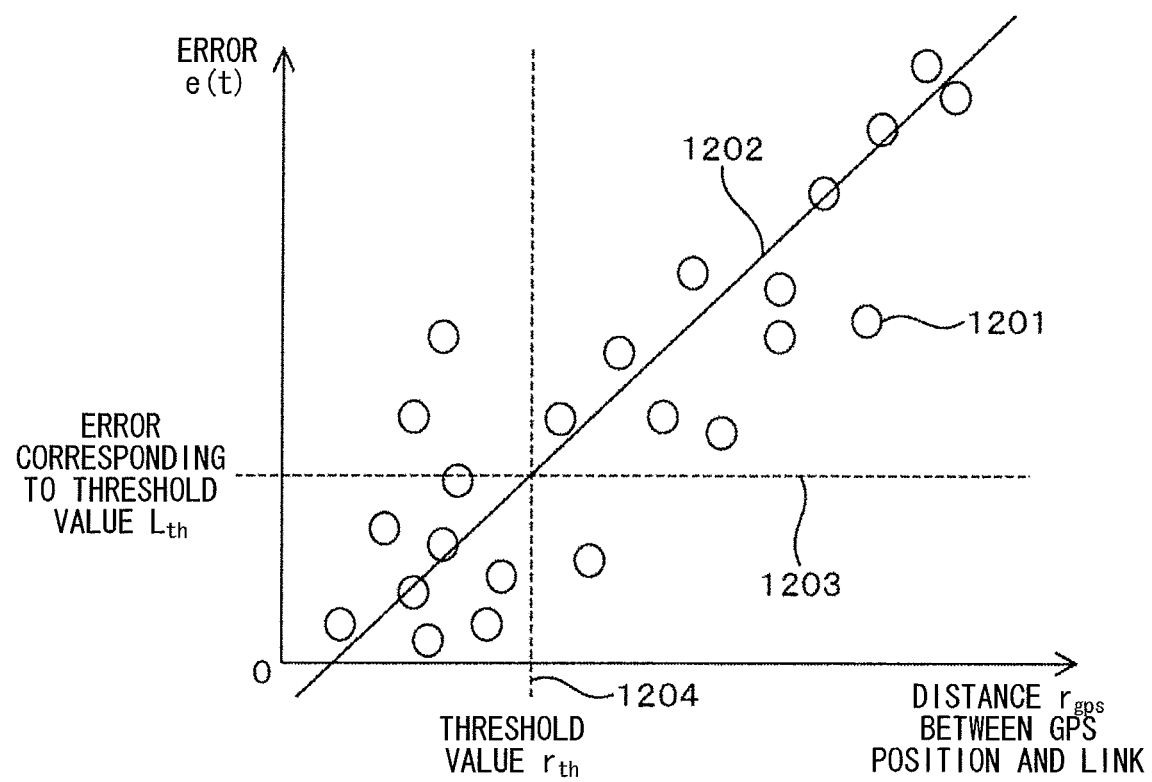
FIG. 12 indicates changes in the error in a link-fusion mathematical expression model and an INS mathematical expression model.

The threshold value calculation unit 104 is able to generate a distribution graph such as that shown in FIG. 12, by using the distance $r_{GPS}(t)$ from the currently estimated position to the link position and the error e(t) of each model having been input from the probability model filtering processing unit 103 up to the time point t. The error is indicated along the vertical axis, whereas the distance $r_{GPS}$ between the currently estimated position (GPS position) and the link position is indicated along the horizontal axis. Points 1201 indicated by O marks in FIG. 12 each represent the error, i.e., the distance between the GPS position and the link. The points are linearly approximated through the method of least squares to obtain a straight line 1202. A threshold value $L_{th}$ under the GPS reception setting is calculated in much the same way as that described in reference to the second embodiment, and a value 1203 representing the corresponding INS error is then determined. When the error, i.e., the distance between the GPS position and the link, is smaller than the error value 1203, the GPS position can be considered to be roughly correct and, accordingly, a distance $r_{th}$ 1204 between the GPS position and the link, measured when the value 1203 is assumed in the straight line 1202, is selected as the threshold candidate value in this situation. The distance $r_{th}$ is output to the threshold determining unit 105 and is saved in the threshold value determining unit 105. The threshold value determining unit 105 designates the average of the threshold candidate value corresponding to the time point t and the threshold candidate values having been calculated up to the time point t as a current threshold value $r_{th}(t)$. The threshold value $r_{th}(t)$ thus determined is set in the mathematical expression model table 108. The mathematical expression model table 108 in FIG. 13 includes the link fusion model assigned with mathematical expression model ID No. 7 and the INS model assigned with mathematical expression model ID No. 5. In the mathematical expression model table 108 assuming these settings, the distance between the GPS position and the link assuming an output value smaller than the threshold value $r_{th}(t)$ is defined as a "small map error" and the distance between the GPS position and the link assuming an output value greater than the threshold value $r_{th}(t)$ is defined as a "large map error".

The mathematical expression model selection unit 107 selects applicable rows and columns in the mathematical expression model table 108, corresponding to the condition quantities having been calculated by the probability model filtering processing unit 103 in the immediately preceding session, by referencing the mathematical expression model table 108. Assuming that the condition quantities having been output from the probability model filtering processing unit 103 through the immediately preceding session are the gyro bias, the gyro scale factor, the sensor mounting angle and the steering angle characteristics and that the respective learning levels have been calculated as "learning complete" for the gyro bias learning level, "learning complete" for the gyro scale factor learning level, "learning incomplete" for the sensor mounting angle learning level and "learning complete" for the steering angle characteristics learning level, the columns enclosed in dotted-line frames 1301 in FIG. 13 are selected. It is also assumed that the following relationship expressed in (expression 20) exists with regard to the distance L(t) between the estimated position and the GPS position having been calculated by the probability model filtering processing unit 103 through the immediately preceding session in relation to the GPS reception threshold value $L_{th}(t)$ calculated through a method similar to that described in reference to the second embodiment.

$$L(t) < L_{th}(t) \quad \text{(expression 20)}$$

In this situation, since the current setting is known to be the GPS reception setting, the row enclosed in a dashed-line frame 1302 in FIG. 13 is selected. It is assumed that the following relationship expressed in (expression 21) exists between the distance from the GPS position to the link and the threshold value.

$$r_{GPS}(t) < r_{th}(t) \quad \text{(expression 21)}$$

In this situation, the map error can be determined to be small and thus, the row enclosed within a solid-line frame 1303 in FIG. 13 are selected. Accordingly, the table elements enclosed in both a dotted-line frame 1301 and a dashed-line frame 1302 or the solid-line frame 1303 each indicate a mathematical expression model that should be selected at this time. Since mathematical expression model No. 5 and mathematical expression model No. 7 are both indicated by the table elements, both the INS model and the link fusion model are selected. Accordingly, at a time point t+1, the probability model filtering processing unit 103 uses (expressions 7), (expression 16) and (expression 17) in the observation equation in the extended Kalman filter.

The above described embodiments are examples and various modifications can be made without departing from the scope of the invention.

What is claimed is:

1. A position estimation device, comprising:
a processor and associated program memory, the processor being programmed to execute:
mathematical expression model processing that:
i. obtains attitude information and positioning information indicating an attitude and a measured position of a mobile object from sensors; and
ii. calculates a position of the mobile object, a condition quantity indicating a moving condition of the mobile object, and an error in the condition quantity through filtering processing executed by using a probability model based upon the attitude information, the positioning information, and a specific mathematical expression model among a plurality of mathematical expression models expressing behavior of the mobile object, which are acquired in advance, the specific mathematical expression model being selected based upon a threshold value;
threshold calculation that calculates a threshold candidate value based upon the error having been calculated by the mathematical expression model processing, wherein the threshold candidate value represents a value of the condition quantity at which a plurality of mathematical expression models intersect;
threshold value setting that updates the threshold value based upon the threshold candidate value; and
mathematical expression model selection that selects the specific mathematical expression model to be used in a next stage of mathematical expression model processing from among the plurality of mathematical expression models, based upon the threshold value updated by the threshold value setting.

2. A position estimation device according to claim 1, wherein:
restrictions imposed with regard to a valid range within which each of the plurality of mathematical expression models expressing the behavior is applicable to the behavior, are defined based upon information that can be collected through observation made from outside or based upon the position, the condition quantity and the error calculated by the mathematical expression model processing;
the threshold value determining determines the threshold value based upon values representing extents of the error calculated each in correspondence to one of the plurality of mathematical expression models; and
the mathematical expression model selection selects the specific mathematical expression model in correspondence to the restrictions.

3. A position estimation device according to claim 2, further comprising:
a database in which the restrictions and the threshold value are stored.

4. A position estimation device according to claim 1 wherein: the updating of the threshold value is based upon whether the condition quantity of the threshold candidate value is time-variant or time-invariant.

5. A computer implemented position estimation method, comprising:
obtaining attitude information and positioning information indicating an attitude and a measured position of a mobile object from sensors;
calculating a position of the mobile object, a condition quantity indicating a moving condition of the mobile object, and an error in the condition quantity through filtering processing executed by using a probability model based upon the attitude information, the positioning information, and a specific mathematical expression model among a plurality of mathematical expression models expressing behavior of the mobile object, which are acquired in advance, the specific mathematical expression model being selected based upon a threshold value;
calculating a threshold candidate value based upon the error having been calculated, wherein the threshold candidate value represents a value of the condition quantity at which a plurality of mathematical expression models intersect;
updating the threshold value based upon the threshold candidate value: and
selecting the specific mathematical expression model to be used in a next stage of mathematical expression model processing from among the plurality of mathematical expression models, based upon the threshold value having been updated.

6. A computer implemented position estimation method according to claim 5, wherein:
restrictions imposed with regard to a valid range, within which each of the plurality of mathematical expression models expressing the behavior is applicable to the behavior, are defined based upon information that can be collected through observation made from outside or based upon the position, the condition quantity and the error having been calculated;
the threshold value is determined based upon values representing extents of the error calculated each in correspondence to one of the plurality of mathematical expression models; and
the specific mathematical expression model is selected in correspondence to the restrictions.

7. A computer implemented position estimation method according to claim 5, wherein: the updating of the threshold value is based upon whether the condition quantity of the threshold candidate value is time-variant or time-invariant.

* * * * *